United States Patent Office 3,031,423
Patented Apr. 24, 1962

3,031,423
METHOD OF CURING BUTYL RUBBER IN THE PRESENCE OF AN OIL
Charles N. Meier, Stow, Ohio, assignor to The Goodyear Tire & Rubber Company, Akron, Ohio, a corporation of Ohio
No Drawing. Filed Dec. 29, 1958, Ser. No. 783,135
12 Claims. (Cl. 260—23.7)

The present invention relates to a process for improving the physical properties of Butyl rubber particularly when used at elevated temperatures, to the product thereof, and to the use of the product in the form of a curing element.

Butyl rubber is a term used to refer to a class of compounds containing about 85 to 99.5% of a $C_4$—$C_7$ isoolefin, such as isobutylene, and about 15 to 0.5% of a $C_4$—$C_8$ diolefin, such as butadiene-1,3 or isoprene. Generally commercial grades of Butyl rubber contain about 95 to 99.5% of isobutylene and correspondingly about 5 to 0.5% of isoprene. Butyl rubber is made in accordance with well known techniques as described, for example, in United States Patent 2,356,128.

Butyl rubber as defined above has many uses, particularly as containers for air under pressure. An important use for Butyl rubber is as a bladder stock in the construction of curing elements useful in the shaping of pneumatic tire casings. Curing elements are subjected to extreme conditions of heat and stress, all tending to deteriorate the Butyl rubber and thereby shorten its useful life as a bladder. These conditions are experienced by curing bladders or diaphragms used, for example, in Bag-O-Matic tire presses illustrated, for example, in "Machinery and Equipment for Rubber and Plastics", 1, 318–19 (1952). It is obviously desirable to prolong the useable life of these Bag-O-Matic bladders for economical reasons, but means for doing this is not obvious nor readily developed.

Many attempts have been made to improve the life of these bladders with some success being observed in the selection of the curing system. In early efforts to improve the aging properties of Butyl rubber, sulfur cures which produced cure cycles up to 100 were replaced with the quinoid curing system which improved bladder life to 200 to 300 cure cycles. Further improvement in bladder life was observed when using phenol derivatives, such as the dimethylol phenols, particularly 2,6-dimethylol-4-hydrocarbon substituted phenol and their condensation polymers; 2,6-dimethylol-4-chloro or aryl substituted phenols and their condensation polymers; 2,6-di(acyloxymethyl) - 4 - hydrocarbyl phenols; 2,4,6-tris(acyloxy methyl)phenyl alkanoates; 2,6-di(alkoxymethyl)-4-hydrocarbyl phenols; the reaction product of formaldehyde and 3,4,5-trialkyl phenol; bis(3-alkyl-5-methylol-6-hydroxyphenyl)methane; and similar phenolic derivatives. Further improvement in the useful life of Butyl rubber bladder stock was observed when chlorinated compounds were used in combination with these phenolic derivatives, including heavy metal halides, chlorosulfonated polyethylene, polychloroprene, and chlorinated paraffin wax.

It is now discovered that, if an oil which is substantially incompatible with the Butyl rubber is added to the Butyl stock in combination with a phenolic derivative curing agent of the type disclosed above, either used alone or in combination with a vulcanization accelerator of the type mentioned above, for curing Butyl stock, an unexpected improvement in the useful life of a curing bladder made therefrom is observed.

Ordinarily, one skilled in this art would reason that the useful life of a curing bladder might be extended by adding a plasticizer to the stock and particularly one that is compatible with the Butyl rubber. However, when such a plasticizer was added exceptional improvement was not observed, thus leading one to believe that no different result could be expected using another oil and particularly an oil not compatible with the Butyl rubber. Since a compatible oil type of plasticizer did not improve the useful life of a Butyl rubber bladder, it would be less likely for one skilled in this art to consider adding an oil which is not compatible with the Butyl rubber stock since plasticizing action, and therefore improved life, particularly under the conditions in which a bladder is used, depends upon the solubility of the oil in the rubber being plasticized. However, it has been observed in a most unexpected manner that the addition of castor oil to Butyl rubber stock greatly improves its useful life.

The following examples show the results obtained when using an oil incompatible with Butyl rubber in contrast to a petroleum oil compatible with Butyl rubber. All parts are by weight unless otherwise indicated.

| Ingredients | Example 1 | Example 2 |
|---|---|---|
| Butyl Rubber (a commercial grade of a synthetic rubber made by copolymerizing isobutylene and isoprene and containing about 2½% of combined isoprene) | 100.00 | 100.00 |
| Chloroprene | 5.00 | 5.00 |
| Carbon Black | 50.00 | 50.00 |
| Zinc Oxide | 5.00 | 5.00 |
| Petroleum Oil [1] | 5.00 | |
| Castor Oil | | 5.00 |
| Amberol ST-137 | 12.00 | 12.00 |

PHYSICAL PROPERTIES

| | Example 1 | | Example 2 | |
|---|---|---|---|---|
| | Orig. °F. | Aged [2] | Orig. °F. | Aged [2] |
| 300% Modulus: | | | | |
| 15/330° F | 470 | | 270 | |
| 35/330° F | 910 | | 660 | |
| 70/330° F | 1,380 | 1,060 | 930 | 960 |
| 140/330° F | 1,500 | 1,130 | 1,020 | 980 |
| 500% Modulus: | | | | |
| 15/330° F | | | | |
| 35/330° F | 920 | | 560 | |
| 70/330° F | 1,750 | | 1,330 | |
| 140/330° F | | | 1,720 | |
| | | | 1,780 | |
| Ult. Tensile, p.s.i.: | | | | |
| 15/330° F | 1,650 | | 1,410 | |
| 35/330° F | 1,930 | | 1,930 | |
| 70/330° F | 1,890 | 1,290 | 2,010 | 1,440 |
| 140/330° F | 1,880 | 1,330 | 1,880 | 1,490 |
| Percent Elongation at Break: | | | | |
| 15/330° F | 800 | | 940 | |
| 35/330° F | 555 | | 735 | |
| 70/330° F | 425 | 365 | 635 | 495 |
| 140/330° F | 380 | 360 | 555 | 495 |

| | R. T. | 200° | R. T. | 200° |
|---|---|---|---|---|
| Pierce Groove Flex: [3] | | | | |
| 70/330° F | 118 | 15 | 1,540 | 160 |
| 140/330° F | 25 | 7 | 640 | 89 |
| Compression Set (ASTM Method B) Hardness: | | | | |
| 70/330° F | 61 | 65 | 60 | 67 |
| 140/330° F | 63 | 63 | 63 | 66 |
| Percent Set: | | | | |
| 70/330° F | 6.0 | 6.6 | 12.0 | 7.8 |
| 140/330° F | 5.6 | 6.3 | 6.6 | 7.0 |

| | 250° | 350° | 250° | 350° |
|---|---|---|---|---|
| Hot Tensile, p.s.i.: | | | | |
| 70/330° F | 835 | 650 | 1,120 | 815 |
| 140/330° F | 990 | 600 | 1,025 | 865 |
| Hot Elongation, Percent: | | | | |
| 70/330° F | 280 | 175 | 485 | 330 |
| 140/330° F | 210 | 160 | 415 | 325 |

[1] A refined lubricating oil of the paraffinic-naphthenic type s.g. 0.9–sold as L225 by Shell Oil Company.
[2] 12 hours in a steam/air autoclave.
[3] Minutes to grow one inch.

From the examples above it is observed that castor oil has a profound improved effect on the flex life of Butyl rubber in contrast to the use of a Butyl rubber compatible petroleum oil as shown in Example 1. At the same time, the use of castor oil does not degrade the other properties. In fact, many of these properties show an improvement on aging as may be seen from the data for ultimate tensile, elongation, hot tensile, and hot elongation. Butyl rubber containing a non-compatible oil like castor oil may be cured under conventional conditions of time and temperature. Temperatures ranging from 220° F. to 400° F., preferably 300 to 350° F., may be used and times ranging from 5 minutes to 3 hours may be used, preferably from about 35 minutes to 140 minutes.

Although castor oil is preferred in producing the unexpected results in extending the useful life of Butyl rubber, particularly when used in the construction of curing elements, any oil which is not compatible with Butyl rubber or of a relatively low solubility, that is from about 1 to about 3%, may be used in this invention. Hydroxylated oils similar to castor oil will function in a manner similar to that of castor oil when used in combination with Butyl rubber and a curing agent of the type mentioned above, either alone or in combination with a curing agent accelerator of the type mentioned above. Also the esters of the fatty acids may be used including the esters of ricinoleic acid and more specifically methyl ricinoleate, ethyl ricinoleate, propyl ricinoleate, butyl ricinoleate, glycerine α-mono-ricinoleate, and the esters of myristic acid such as gamma-chloro-propylene glycol-α-myristate. Certain polyesters may also be used including polypropylene adipate, polypropylene azelate and polyethylene adipate. Polyglycols may also be used including the polyethylene glycols having an average molecular weight of 200, 300, 400, and 600 each of which are oils; the polypropylene glycols having an average molecular weight of 150, 425, 1025, and 2025 each of which are liquids; the methoxy polyethylene glycols having an average molecular weight of 350, 550, and 750 with the lower two being oils and the other having a freezing point of 26–32° C.; and such other polyglycols as the polybutylene glycols and the polyneopentyl glycols. It is preferable to use the lower molecular weight polyglycols. The above mentioned polyglycols may also be esterified with fatty acids to yield the corresponding mono- or di-esters, each of which can be used in the present invention, where the resulting compound is an oil and of a very slight solubility in the rubber composition. Glycerin, particularly ethylene glycol, may also be used in the present invention.

It has been found that as little as 3 parts of castor oil may be used to increase the useful life of Butyl rubber bladders. Oils of the castor oil type may be used in amounts preferably from 5 parts to 15 parts. It is not desirable to use more than 15 parts since additional improvement in aging life is not observed.

It is preferred to use the castor oil in combination with Amberol ST–137 (2,6-dimethylol-4-dioctylphenol condensate) or any other similar dialcohol phenol and condensation product thereof in amount from about 3 parts to about 25 parts and preferably from about 10 parts to about 15 parts per 100 parts of Butyl rubber. The amount of compounding ingredients used is not critical since it is within the skill of those familiar with this art to adjust the amount of these ingredients to bring about the most desirable results.

The blending of the components with the Butyl rubber may be done on an open mill or in an internal mixer in accordance with well known techniques used in the art of rubber compounding. The castor oil is added to the Butyl rubber stock along with the other compounding ingredients and mixing is continued until a homogeneous blend is obtained.

The compounded Butyl rubber bladder stock is used in the construction of curing elements in a conventional manner in that ordinary methods for their construction may be used.

While certain representative embodiments and details have been shown for the purpose of illustrating the invention, it will be apparent to those skilled in this art that various changes and modifications may be made therein without departing from the spirit or scope of the invention.

I claim:
1. A method of vulcanizing a synthetic rubbery copolymer of an isoolefin having from 4 to 7 carbon atoms with from 0.5 to 10% of isoprene which comprises mixing 100 parts of said copolymer at a temperature from about 222° F. to 400° F. for from about 5 minutes to 3 hours with from 2 to 15 parts of a derivative of a phenol selected from the group consisting of 2,6-dimethylol-4-hyrocarbon substituted phenols, condensation polymers of 2,6-dimethylol-4-hydrocarbon substituted phenols, 2,6-dimethylol-4-chloro substituted phenols, condensation polymers of 2,6-dimethylol-4-chloro substituted phenols, 2,6-dimethylol-4-aryl substituted phenols, condensation polymers of 2,6-dimethylol-4-aryl substituted phenols, 2,6-di(acyloxymethyl)-4-hydrocarbyl phenols, 2,4,6-tris(acyloxymethyl) phenyl alkanoates, 2,6-di(alkoxymethyl)-4-hydrocarbyl phenols, the reaction product of formaldehyde and 3,4,5-trialkyl phenol, and bis(3-alkyl-5-methylol-6-hydroxyphenyl) methane, and with from 3 to 15 parts of an oily liquid selected from the group consisting of hydroxylate oils, esters of fatty acids, polypropylene adipate, polypropylene azelate, polyethylene adipate and polyglycols with said copolymer.

2. The method of claim 1 in which the oily liquid is a hydroxylated oil.

3. The method of claim 1 in which the oily liquid is castor oil.

4. The method of claim 3 in which 5 parts of castor oil is used.

5. An improved vulcanizate characterized by resistance to deterioration at elevated temperatures comprising 100 parts by weight of a synthetic rubbery copolymer of an isoolefin having from 4 to 7 carbon atoms with from 0.5 to 10% of isoprene, vulcanized with from 2 to 15 parts of a derivative of a phenol selected from the group consisting of 2,6-dimethylol-4-hydrocarbon substituted phenols, condensation polymers of 2,6-dimethylol-4-hydrocarbon substituted phenols, 2,6-dimethylol-4-chloro substituted phenols, condensation polymers of 2,6-dimethylol-4-chloro substituted phenols, 2,6-dimethylol-4-aryl substituted phenols, condensation polymers of 2,6-dimethylol-4-aryl substituted phenols, 2,6-di(acyloxymethyl)-4-hydrocarbyl phenols, 2,4,6-tris(acyloxymethyl) phenyl alkanoates, 2,6-di(alkoxymethyl)-4-hydrocarbyl phenols, the reaction product of formaldehyde and 3,4,5-trialkyl phenol, and bis (3-alkyl-5-methylol-6-hydroxyphenyl)methane, and with from 3 to 15 parts of an oily liquid selected from the group consisting of hydroxylated oils, esters of fatty acids, polypropylene adipate, polypropylene azelate, polyethylene adipate and polyglycols with said copolymer.

6. A curing element comprised of the vulcanizate of claim 5.

7. The vulcanizate of claim 5 in which the oily liquid is a hydroxylated oil.

8. The vulcanizate of claim 5 in which the oily liquid is castor oil.

9. The vulcanizate of claim 8 in which the castor oil is present in 5 parts.

10. A curing element comprised of the vulcanizate of claim 8.

11. An improved vulcanizate characterized by resistance to deterioration at elevated temperatures comprising 100 parts by weight of a synthetic rubbery copolymer of an isoolefin having from 4 to 7 carbon atoms with from 0.5 to 10% of isoprene, vulcanized with from 2 to 15 parts of the condensation polymer of 2,6-dimethylol-4-dioctylphenol and with from 3 to 15 parts of an oily liquid selected from the group consisting of hydroxylated oils, esters of fatty acids, polypropylene adipate, polypropylene azelate, polyethylene adipate and polyglycols with said copolymer.

12. An improved vulcanizate characterized by resistance to deterioration at elevated temperatures comprising 100 parts by weight of a synthetic rubbery copolymer of an isoolefin having from 4 to 7 carbon atoms with from 0.5 to 10% of isoprene, vulcanized with from 2 to 15 parts of the condensation polymer of 2,6-dimethylol-4-chloro substituted phenol and with from 3 to 15 parts of an oily liquid selected from the group consisting of hydroxylated oils, esters of fatty acids, polypropylene adipate, polypropylene azelate, polyethylene adipate and polyglycols with said copolymer.

References Cited in the file of this patent

UNITED STATES PATENTS

| | | |
|---|---|---|
| 2,399,262 | Thomas | Apr. 30, 1946 |
| 2,698,041 | Morrissey et al. | Dec. 28, 1954 |
| 2,713,572 | Hall | July 19, 1955 |
| 2,734,039 | Peterson et al. | Feb. 7, 1956 |
| 2,735,813 | Denman | Feb. 21, 1956 |
| 2,829,132 | Tawney et al. | Apr. 1, 1958 |